(12) United States Patent
Merrill et al.

(10) Patent No.: US 9,056,354 B2
(45) Date of Patent: Jun. 16, 2015

(54) MATERIAL SYSTEM OF CO-SINTERED METAL AND CERAMIC LAYERS

(75) Inventors: Gary B. Merrill, Orlando, FL (US);
Cora Schillig, Orlando, FL (US);
Andrew J. Burns, Longwood, FL (US);
John R. Paulus, Afton, VA (US)

(73) Assignees: SIEMENS AKTIENGESELLSCHAFT, München (DE); MIKRO SYSTEMS, INC, Charlottesville, VA (US)

( * ) Notice: Subject to any disclaimer, the term of this patent is extended or adjusted under 35 U.S.C. 154(b) by 879 days.

(21) Appl. No.: 13/221,077

(22) Filed: Aug. 30, 2011

(65) Prior Publication Data

US 2013/0052442 A1    Feb. 28, 2013

(51) Int. Cl.
| | | |
|---|---|---|
| B32B 3/00 | (2006.01) |
| B22F 3/10 | (2006.01) |
| B22F 7/02 | (2006.01) |
| B22F 3/105 | (2006.01) |
| B32B 15/16 | (2006.01) |
| B82Y 30/00 | (2011.01) |

(52) U.S. Cl.
CPC . *B22F 3/105* (2013.01); *B22F 7/02* (2013.01); *B32B 15/16* (2013.01); *C04B 2235/5454* (2013.01); *C04B 2235/666* (2013.01); *C04B 2235/95* (2013.01); *C04B 2235/9607* (2013.01); *C04B 2235/9615* (2013.01); *B82Y 30/00* (2013.01)

(58) Field of Classification Search
CPC .................. B32B 15/04; B32B 18/00; C04B 2237/30–2237/385; C04B 2237/40–2237/408
USPC ........................................................ 264/642
See application file for complete search history.

(56) References Cited

U.S. PATENT DOCUMENTS

| | | | | |
|---|---|---|---|---|
| 3,284,174 A | * | 11/1966 | Zimmer | 428/547 |
| 4,283,441 A | * | 8/1981 | Haecker et al. | 427/126.2 |
| 4,296,148 A | * | 10/1981 | Friese | 427/125 |
| 4,434,211 A | * | 2/1984 | Shoher et al. | 428/552 |
| 4,769,294 A | * | 9/1988 | Barringer et al. | 428/702 |
| 4,835,039 A | * | 5/1989 | Barringer et al. | 428/210 |
| 5,279,909 A | * | 1/1994 | Horner et al. | 429/184 |
| 5,350,637 A | * | 9/1994 | Ketcham et al. | 428/539.5 |
| 5,455,000 A | * | 10/1995 | Seyferth et al. | 419/36 |

(Continued)

FOREIGN PATENT DOCUMENTS

| | | |
|---|---|---|
| DE | 19857591 A1 | 6/2000 |
| EP | 0967835 A1 | 12/1999 |

(Continued)

*Primary Examiner* — Erin Snelting

(57) ABSTRACT

A method of forming a ceramic layer on a metal substrate. A substrate (40) is formed (54) from a powder (24) of the metal, and may optionally be partially sintered (56). A layer (43) of powdered ceramic is formed (58) on or applied against the substrate (45). The ceramic powder may include a proportion of nano-sized particles effective to reduce the ceramic sintering temperature and to increase the sintering shrinkage of the ceramic layer to more closely match that of the metal substrate. The substrate and layer are then co-sintered (21, 60) at a temperature and for a duration that densifies and bonds them, producing a metal/ceramic layered material system with low interface stress that is durable to temperature variations in a gas turbine. Spark plasma sintering (32, 34, 36) may be used to sinter and/or co-sinter substrate and layer materials that normally cannot be sintered.

17 Claims, 5 Drawing Sheets

(56) References Cited

U.S. PATENT DOCUMENTS

| | | | |
|---|---|---|---|
| 5,908,713 | A | 6/1999 | Ruka et al. |
| 6,235,370 | B1 | 5/2001 | Merrill et al. |
| 6,384,365 | B1 | 5/2002 | Seth et al. |
| 6,576,182 | B1 * | 6/2003 | Ravagni et al. ............... 264/628 |
| 6,953,603 | B2 * | 10/2005 | Nonninger et al. ........... 427/226 |
| 7,182,581 | B2 | 2/2007 | Bostanjoglo et al. |
| 7,247,002 | B2 | 7/2007 | Albrecht et al. |
| 7,387,758 | B2 | 6/2008 | Merrill et al. |
| 7,413,798 | B2 | 8/2008 | Burns et al. |
| 7,648,605 | B2 | 1/2010 | Merrill et al. |
| 7,744,351 | B2 | 6/2010 | Jabado et al. |
| 8,101,280 | B2 * | 1/2012 | Akarsu et al. ................ 428/469 |
| 2003/0111714 | A1 * | 6/2003 | Bates et al. .................. 257/678 |
| 2003/0142463 | A1 * | 7/2003 | Nakamura et al. ......... 361/321.2 |
| 2004/0009333 | A1 * | 1/2004 | Miyazaki et al. ............. 428/209 |
| 2007/0205102 | A1 * | 9/2007 | Scholl et al. ............. 204/298.12 |
| 2010/0119777 | A1 | 5/2010 | Merrill et al. |
| 2013/0052415 | A1 * | 2/2013 | Burns et al. ................... 428/141 |
| 2013/0177740 | A1 * | 7/2013 | Merrill et al. ................. 428/158 |
| 2013/0307123 | A1 * | 11/2013 | Song ............................ 257/618 |

FOREIGN PATENT DOCUMENTS

| | | |
|---|---|---|
| EP | 1172460 A2 | 1/2002 |
| EP | 1522604 A1 | 4/2005 |
| WO | 0172664 A1 | 10/2001 |
| WO | 2004071631 A2 | 8/2004 |

* cited by examiner

MATERIAL SYSTEM OF CO-SINTERED METAL AND CERAMIC LAYERS

FIELD OF THE INVENTION

The invention relates to material systems for components in the hot gas path of a gas turbine, and particularly to methods and compositions for fabricating a metal substrate with a ceramic outer layer.

BACKGROUND OF THE INVENTION

Ceramic powders and metal powders can be formed into desired shapes, and then sintered to form dense bodies that can be structural. Such forming methods offer rapid manufacturing of net-shape parts. The sintering shrinkage of typical metal powders is about 6%, while shrinkage of typical ceramic powders is about 1%. Furthermore, ceramics require much higher sintering temperatures than metals. These disparities, plus different thermal expansion rates, make bonding of ceramics to metals difficult. However, such bonding is needed in order to provide ceramic coatings or layers on metal components for gas turbine engine applications, where the ceramic coating serves as a thermal barrier and/or provides object impact resistance and/or imparts desirable abrasion characteristics. Some gas turbine components can be exposed to temperatures that cycle from ambient temperatures to about 1,500° C. between shut-down and operational phases of the gas turbine.

Joining of ceramic coatings to metal substrates is known to be done by surface deposition techniques such as High Velocity Oxygen Fuel spraying (HVOF), Air Plasma Spraying (APS), and Physical Vapor Deposition (PVD). These methods provide a non-chemical bond that has somewhat limited bond integrity. The difference in thermal expansion between a metal substrate and a ceramic layer can limit the temperature range that such a bi-layer material system can withstand before strain-induced delamination or deformation occurs.

BRIEF DESCRIPTION OF THE DRAWINGS

The invention is explained in the following description in view of the drawings that show.

DETAILED DESCRIPTION OF THE INVENTION

An aspect of the invention is to co-process a metal substrate and a ceramic layer thereon. The metal may be a refractory elemental metal or a refractory alloy, such as one based on chromium (Cr), molybdenum (Mo), niobium (Nb), tantalum (Ta), tungsten (W), or iron (Fe). A metal powder may be mixed with a formable binder, and formed into a substrate that may have engineered surface features. Optionally, the substrate may be partially sintered to a predetermined degree, such as about 85-90% of its full density. Herein, "full density" means at least 97% of the theoretical density of a given material at the sintering temperature. Optionally, an intermediate bond coating of a material such as platinum, platinum aluminide, or MCrAlY (where M=Co, Ni or Co/Ni) may be applied to the substrate in a thickness such as 5-100 or 5-500 microns for substrate oxidation protection and improved bonding of the ceramic layer.

A ceramic powder may then be applied as a layer onto the substrate, for example as a ceramic/binder mixture injected onto the substrate or as ceramic powder that is pressed onto the substrate. Alternately the ceramic powder may be cold-pressed into a compact in a first die, then removed and placed on and pressed against the substrate in a second die for co-sintering. If engineered surface features are formed on the substrate, the ceramic layer mates with those surface features to interlock the two materials together. The substrate and the ceramic powder are then exposed to a co-sintering cycle that densifies the substrate and the ceramic concurrently to a desired respective final density of each layer. This co-sintering bonds the metal substrate and ceramic layer together. The final density may for example be the full density of the substrate, and full or less than full density of the ceramic layer. In any case, the final densities do not change by any effective amount during operation of the component. As an example, the final co-sintering may be done at about 1600-1700° C. for a duration effective to reach the desired final density of each layer, and these final densities do not change within an exemplary operating range of about 0-1500° C., taken from room temperature to a maximum operating temperature.

Figure 1:
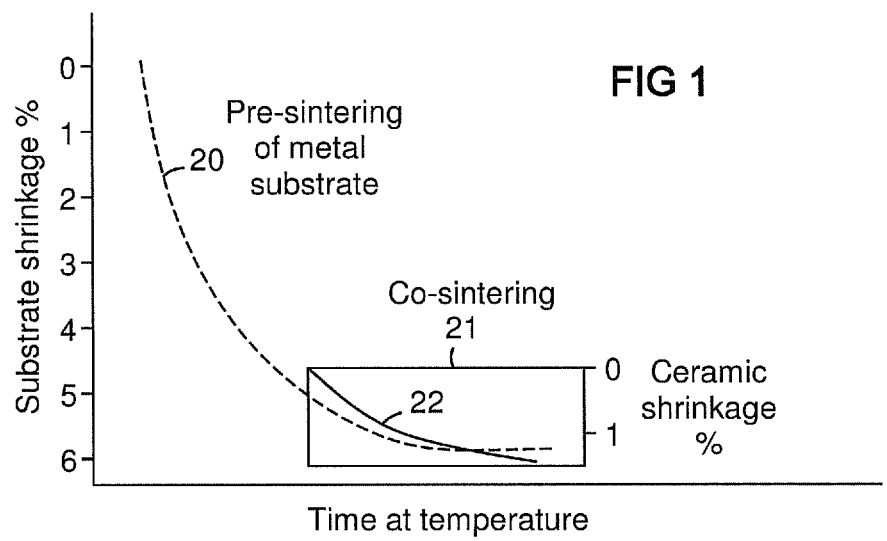
FIG. 1 illustrates shrinkage curves of a metal and ceramic couple during two sintering stages, including partial sintering of the metal substrate followed by co-sintering of the substrate and ceramic layer thereon per aspects of the invention.

FIG. 1 illustrates shrinkage curves for partial sintering 20 of a metal substrate followed by co-sintering 21 of the substrate and a ceramic layer after application of the layer. In this example, during the two sintering steps 20, 21, the metal shrinks about 6%, whereas during the co-sintering 21 step, which is the sole sintering step 22 for the ceramic, the ceramic shrinks about 1.5%. However, the metal and ceramic shrink about the same amount during the co-sintering step 21.

Normally, ceramic has a much higher sintering temperature than metal. This makes co-sintering of metal and ceramic layers impractical since the metal can melt and lose some of its characteristics and surface features. A conventional sinterable ceramic powder may have an average particle diameter of over 1 micron or over 10 microns or particles in a range of 10-45 microns. Inclusion of nano-scale ceramic particles can reduce the sintering temperature by as much as 350° C. in some embodiments, which can allow co-sintering and bonding of the metal and ceramic layers. This sintering temperature reduction occurs particularly when the ceramic powder comprises at least 2% and up to 100% by volume of particles less than 100 nm average diameter, and it especially occurs with particles less than 50 nm average diameter. The fewer nano-particles there are in the powder, the less is the effect, and the more nano-particles there are, the higher is the sintering shrinkage. Thus, a percentage of nano-particles may be selected to match the final sintering shrinkage/temperature curve of a given substrate material. Exemplary suitable nano-particle proportions include 2% to 50% and especially 5% to 40% ceramic nano-particles (less than 100 nm or less than 50 nm) by volume in the ceramic powder.

A material couple comprising a metal material and a ceramic material may be selected that have respective coefficients of thermal expansion (CTE) within 15% or, in some embodiments, within 10% of each other throughout the operating range plus the co-sintering range of the two materials. For example, if the design operating range is 0-1500° C. and the co-sintering range is 1600-1700° C., then the respective CTEs may be matched within the above tolerances from 0-1700° C. For example, if a metal alloy has a CTE of $8 \times 10^{-6}$/° C. at a given temperature, then a ceramic material meeting the 15% criterion has a CTE at that temperature of $(8 \pm 15\%) \times 10^{-6}$/° C. or $(6.8$ to $9.2) \times 10^{-6}$/° C. In other embodiments the respective CTEs may be matched within the above tolerances from 0-1400° C.

The material couple may be further selected to have respective co-sintering shrinkage curves that stay within 1.0% of each other, and especially within 0.6% of each other, at each temperature throughout the co-sintering stage. This means that, after pre-sintering the substrate to a predetermined portion of its final density, such as between 85%-90% of full density, the remaining shrinkage of the substrate and the total shrinkage of the ceramic during co-sintering stay within the above limits. For example, if a metal alloy substrate is pre-sintered to 85% of full density, and this leaves a remaining shrinkage of 1.5% at 1650° C., then the ceramic material after injection or compaction should have a co-sintering shrinkage of 0.5 to 2.5% or especially 0.9 to 2.1% at 1650° C. In an embodiment of the invention, the particle size distribution of the substrate and ceramic layer is selected to control sintering shrinkage of the two materials such that co-sintering of the material pair can be achieved with a desired and acceptable degree of sintering mismatch without the necessity of pre-sintering the substrate.

Examples of compatible material couples are shown in Table 1 below, where MoCu is a molybdenum-copper composite powder. ODS means oxide dispersion strengthened metal alloy. In the table below, the exemplary ODS is based on FeCrSi—$Y_2O_3$. The term "8 mol YSZ" means yttria-stabilized zirconia ($ZrO_2$ with 8 mol % $Y_2O_3$). Further high-temperature metals, including superalloys, may be matched with these and other ceramics using the methods and parameters described herein.

TABLE 1

| Pair | Metal | CTE $10^{-6}$/° C. | Ceramic | CTE $10^{-6}$/° C. |
|---|---|---|---|---|
| 1) | MoCu | 7.6-8.5 | $Al_2O_3$ | 7.0-8.4 |
| 2) | Ta | ~6.5 | $Al_2O_3$ | 7.0-8.4 |
| 3) | ODS | ~10.8 | 8 mol YSZ | ~10.5 |

Several powdered materials that meet the compatibility criteria described above cannot normally be sintered or co-sintered due to their constituents forming oxides that block particle cohesion or adhesion. However, the inventors found that spark plasma sintering (SPS) overcomes this limitation, both in sintering the metal substrate and the ceramic layer, and in the co-sintered bond between them, possibly due to ionic stripping of the oxides. For example, the inventors found that co-sintering FeCrSi—$Y_2O_3$ and 8 mol YSZ using spark plasma sintering under the conditions described herein provides an uncharacteristically strong metal/ceramic bond, which is not normally possible with these types of materials. SPS quickly generates high heat precisely at the inter-particle contact points and near points, cleaning and fusing the particles without overheating the material.

Figure 2:
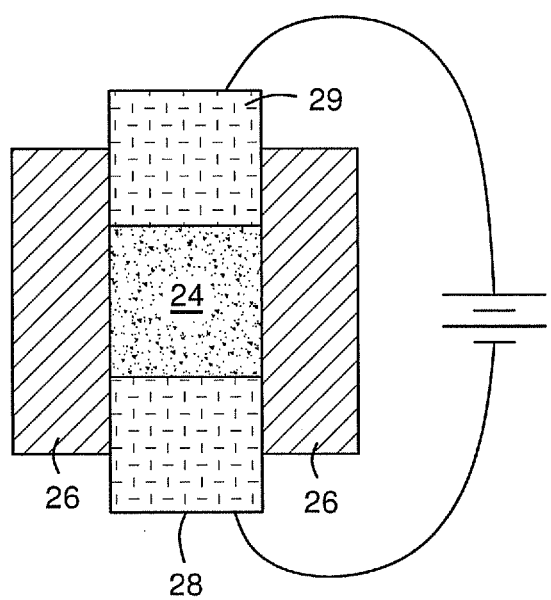
FIG. 2 shows a sinterable powder in a die case with electrodes that apply a voltage across the powder effective for spark plasma sintering.
Figure 3:
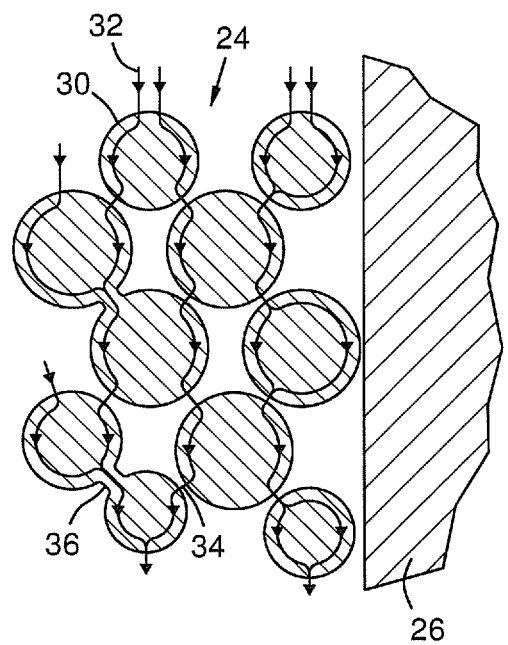
FIG. 3 shows an electric current passing through a powder during spark plasma sintering.

FIG. 2 shows a sinterable metal powder 24 in an electrically insulated die case 26 with electrodes 28, 29 that apply a voltage across the powder for spark plasma sintering. One of the electrodes may be a piston that compresses the sinterable powder. FIG. 3 shows an electric current 32 passing through the powder 24, jumping 34 between the particles 30, and fusing them 36.

Figure 4:
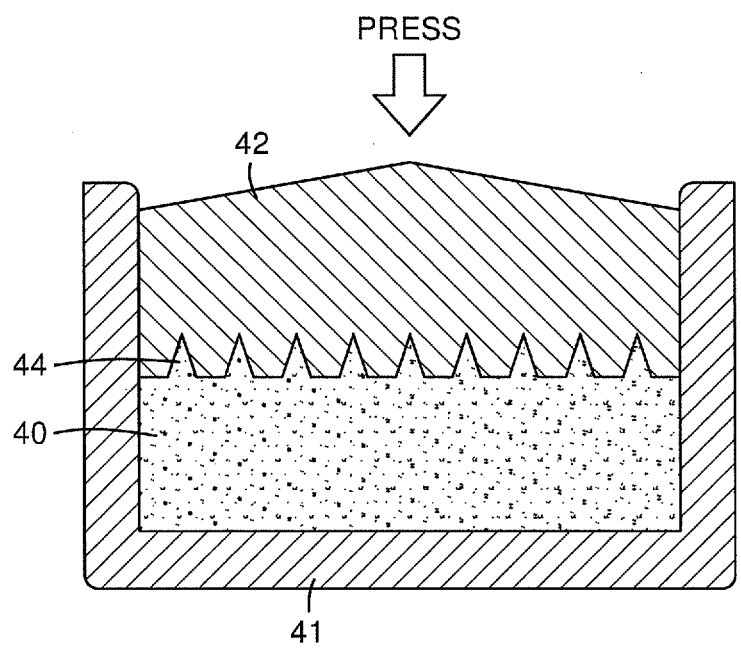
FIG. 4 shows a metal powder/binder being formed into a substrate with surface features.

FIG. 4 shows a metal powder/binder 40 being formed into a substrate in a mold or die 41. The mold may have a form 42 that may operate as a piston, which forms interlocking surface features 44 on the substrate. These interlocking features may have convex or concave geometries such as cones, pyramids, cylindrical depressions, and the like. The surface features 44 may be fabricated by mixing the metal powder with a binder such as a polymeric binder, then injecting or pressing the metal/binder in the mold. The metal/binder may be heated in the mold of FIG. 4, causing the binder to melt and flow with the metal powder into the surface patterns of the form 42. Interlocking features 44 such as protrusions with undercuts may be formed using a thin flexible form that can be removed from the undercuts after cooling, or they may be formed by other known means. After the surface features are formed, the substrate optionally may be partially sintered prior to application of a ceramic coating. The substrate may form a wall of a gas turbine component, such as a combustor wall, transition duct, turbine shroud, vane, or blade.

Figure 5:
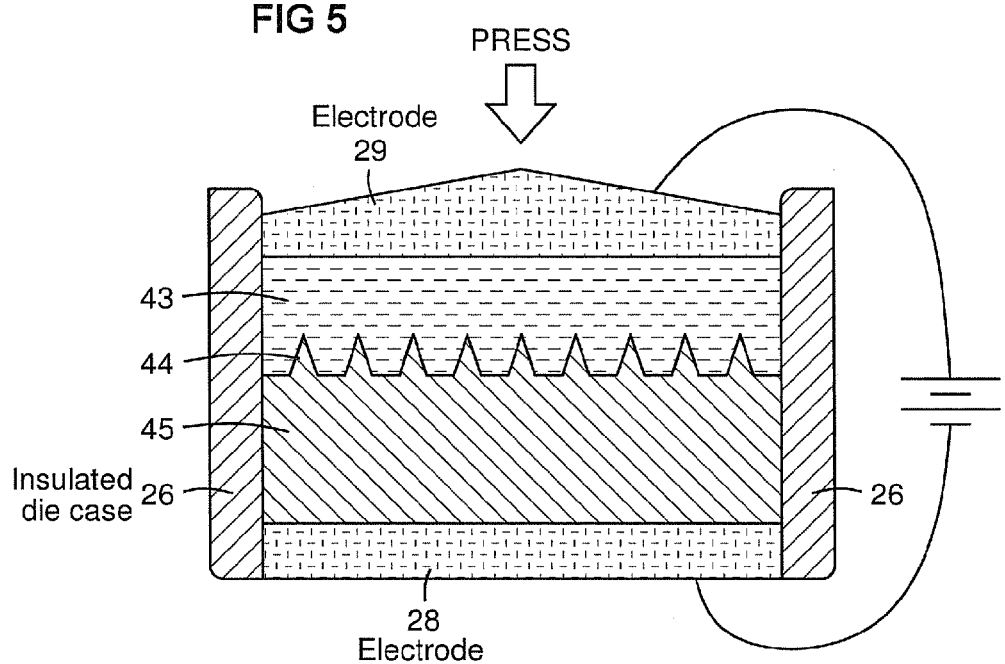
FIG. 5 shows a ceramic powder being pressed into the substrate of FIG. 4 and co-sintered with spark plasma sintering.

FIG. 5 shows a ceramic powder 43 being pressed onto a substrate 45 in an electrically insulating die case 26. The ceramic powder may be mixed with a binder and injected into the die case and/or pressed with a piston as shown. The binder allows the ceramic powder to flow around and to mechanically engage any protruding undercut or other geometric surface feature 44 on the substrate in order to reinforce the chemical bond formed there between. The binder used for the ceramic powder may have a lower working temperature than any binder used for the substrate so that the substrate material is not softened. Alternatively, the binder may have the same working temperature if the substrate has solidified initially. Voltage is applied across the ceramic powder and substrate through electrodes 28, 29 effective to produce spark plasma sintering in both layers 43, 45 that densifies both layers to a desired final density. One of the electrodes 29 may be a piston that compresses the ceramic powder 43.

Figure 6:
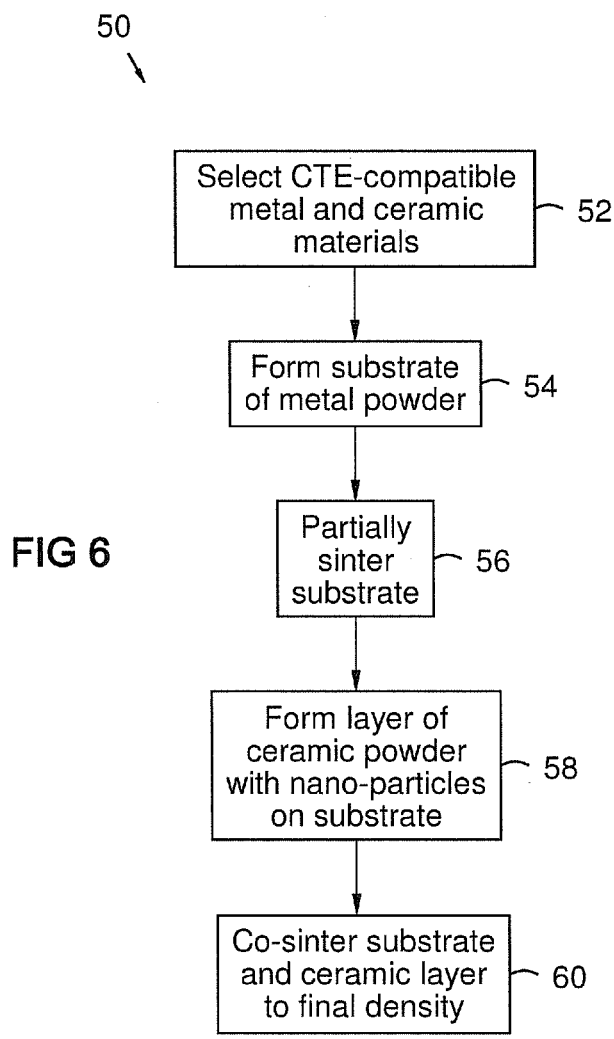
FIG. 6 illustrates steps of one embodiment of the invention.

FIG. 6 shows a basic fabrication process 50 in accordance with one embodiment of the invention with steps of: 52—Selecting CTE-compatible metal and ceramic materials; 54—Forming a substrate from a powder of the metal material; 56—Partially sintering the substrate; 58—Forming a layer on the substrate from a powder of the ceramic material containing nano-particles; and 60—Co-sintering the substrate and the layer to final density.

Figure 7:
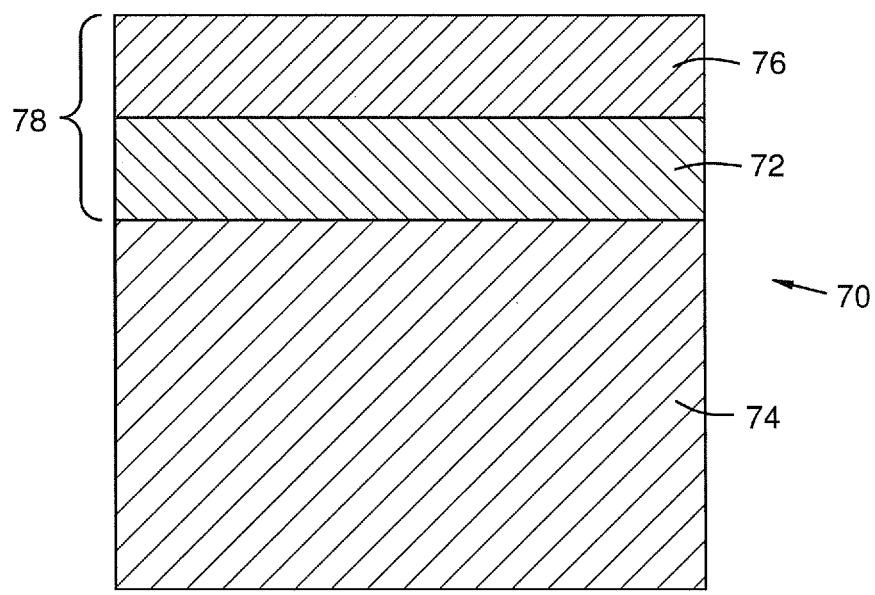
FIG. 7 is a cross-sectional view of a gas turbine component in accordance with an aspect of the invention.

In another embodiment of the present invention, cold powders are engineered to be cooperatively matched for both sintering shrinkage and thermal expansion coefficients and are cold pressed into individual layers, and then they are stacked into a graphite die and sintered with a Spark Plasma Sintering process. More than two layers may be used, as illustrated in FIG. 7, such as when a refractory/ceramic powder layer 72 is bonded between a refractory metallic substrate 74 and a ceramic layer 76 to produce a graded interlayer co-bonded structure 70 such as may be useful as an erosion resistant thermal barrier coating system. Such an embodiment would require co-sintering the intermediate layer 72 including metal and ceramic particles onto the substrate 74, and also co-sintering the top layer 76 having only ceramic particles onto the intermediate layer 72 with a co-processing cycle wherein the sintering shrinkage of the substrate 74 and that of the intermediate layer 72 stay within 1.0% of each other throughout the co-sintering and the sintering shrinkage of the intermediate layer 72 and that of the top layer 76 stay within 1.0% of each other throughout the co-sintering. Such a method may be used to produce a gas turbine engine component 70 wherein the intermediate layer 72 and the top layer 76 combine to form a monolithic ceramic layer 78 over 2.0 mm thick.

The resulting co-processed system is dense and dimensionally stable and may be used in advanced modular inserts for aggressive, impact resistant, high temperature gas turbine applications. In various embodiments, the methods disclosed herein permit the co-processing of a low expansion alloyed refractory metal system based on chromium, molybdenum, niobium, tantalum, tungsten and/or iron with a sinter-active ceramic powder overlay composition employing a bi-modal particle size distribution of alumina, stabilized zirconia and/or yttrium aluminum garnet powders.

The inventors found that the process used to form the co-layered material system resulted in a fully coherent strain-free interlayer consisting of interspersed elements of both constituents. The resulting bond strength was able to withstand significant thermal cycling without any observed degradation. Such interspersions of ionic and covalent species have rarely been observed.

The processes and materials described herein allow a much thicker ceramic layer on a metal substrate than was previously possible without the use of a flexible intermediate layer and/or engineered slots in the ceramic layer for strain relief. Whereas prior monolithic ceramic layers in this temperature range were limited to about 0.3 mm thick, the present invention can produce durable monolithic ceramic layers over 1.0 mm thick, including over 2.0 mm thick, for example up to 3.0 mm thick in some embodiments, on superalloy substrates for use over a wide operating temperature range such as 0-1000° C. or 0-1500° C. in some embodiments. Herein, "monolithic" means a layer without a flexible intermediate layer or engineered slots for strain relief.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method of fabricating a metal and ceramic layered material system, comprising:
   selecting a metal material and a ceramic material with respective coefficients of thermal expansion that are within 15% of each other throughout an operating temperature range plus a co-sintering temperature range;
   forming a substrate from a powder of the metal material;
   disposing a layer on the substrate, wherein the layer comprises a powder of the ceramic material containing at least 2% by volume of ceramic nano-particles having an average diameter of less than 100 nm;
   co-sintering the substrate and the layer within the co-sintering temperature range to a final density of the substrate of at least 97% theoretical density; and
   selecting the metal material, the ceramic material, and the percentage of ceramic nano-particles such that the co-sintering produces respective shrinkage amounts of the layer and the substrate that are within 1.0% of each other throughout the co-sintering thereof.

2. The method of claim 1, further comprising partial sintering the substrate forming a pre-sintered substrate prior to the step of disposing of the layer on the substrate.

3. The method of claim 2, further comprising:
   performing the co-sintering by spark plasma sintering; and
   selecting the metal material, the ceramic material, the percentage of ceramic nano-particles, and the amount of the partial sintering wherein the co-sintering produces respective shrinkage amounts of the layer and the pre-sintered substrate that are within 0.6% of each other throughout the co-sintering thereof.

4. The method of claim 2, further comprising:
   disposing the pre-sintered substrate in a die;
   pressing the ceramic material powder onto a surface of the pre-sintered substrate; and
   applying a voltage across the layer and the pre-sintered substrate that concurrently spark plasma sinters the layer and the pre-sintered substrate to respective final densities of the substrate and the layer that do not change significantly over an operating temperature range of the component.

5. The method of claim 1, further comprising:
   forming the layer by mixing the ceramic material powder with a binder to form a ceramic/binder mixture;
   injecting the ceramic/binder mixture onto the substrate; and
   applying a voltage across the substrate and the layer that concurrently spark plasma sinters the layer and the substrate to respective final densities of the substrate and the layer that do not change significantly over an operating temperature range of the component.

6. The method of claim 1, further comprising:
   forming the substrate from a mixture of the metal powder and a binder that forms a metal/binder mixture;
   forming a surface of the substrate that provides engineered interlocking surface features on the substrate;
   forming the layer by filling the interlocking surface features on the substrate with the ceramic powder to provide an interlock there between.

7. The method of claim 1, further comprising:
   selecting the metal and ceramic materials to be a material couple from the set of material couples consisting of: MoCu and $Al_2O_3$; Ta and $Al_2O_3$; and FeCrSi—$Y_2O_3$ and 8 mol YSZ; and
   applying a voltage across the layer and the substrate that concurrently spark plasma sinters the layer and the substrate to respective final densities of the substrate and the layer that do not change significantly over an operating temperature range of the component.

8. A method of fabricating a metal and ceramic layered material system, comprising:
   selecting a metal material and a ceramic material with respective coefficients of thermal expansion that are within 15% of each other throughout a temperature range of 0-1400° C.;
   forming a substrate comprising engineered interlocking surface features from a powder of the metal material;
   partially sintering the substrate to produce a pre-sintered substrate;
   disposing a layer on the pre-sintered substrate, wherein the layer comprises a powder of the ceramic material containing 2% to 50% by volume of ceramic nano-particles having an average diameter of less than 100 nm;
   co-sintering the pre-sintered substrate and the layer enough to achieve a final density of the substrate of at least 97% theoretical density; and
   selecting the metal material, the ceramic material, the percentage of ceramic nano-particles, and a degree of the partial sintering, wherein the co-sintering produces respective shrinkage amounts of the layer and the pre-sintered substrate that are within 1.0% of each other throughout the co-sintering thereof.

9. The method of claim 8, further comprising:
performing the partial sintering to 85%-90% of a full density of the substrate;
performing the co-sintering by spark plasma sintering; and
selecting the metal material, the ceramic material, and the percentage of ceramic nano-particles, wherein the co-sintering produces respective shrinkage amounts of the layer and the pre-sintered substrate that are within 0.6% of each other throughout the co-sintering thereof.

10. A method of fabricating a metal and ceramic layered material system, comprising:
forming a substrate comprising particles of a metal material;
forming a layer comprising particles of a ceramic material comprising a particle size distribution including 5% to 40% of the particles being less than 50 nm in average diameter;
co-sintering the layer onto the substrate with a co-processing cycle wherein a sintering shrinkage of the substrate and a sintering shrinkage of the layer stay within 1.0% of each other throughout the co-sintering to form a chemical bond between the substrate and the layer comprising interspersed elements of both the metal material and the ceramic material.

11. The method of claim 10, wherein the co-sintering comprises spark plasma sintering.

12. The method of claim 10, further comprising partially sintering the substrate prior to the co-sintering step.

13. The method of claim 12, wherein at least one of the partial sintering and the co-sintering comprises spark plasma sintering.

14. The method of claim 10, further comprising selecting the metal material and the ceramic material to have respective coefficients of thermal expansion that are within 15% of each other throughout a temperature range of 0-1700° C.

15. The method of claim 10, further comprising the selecting the metal material and the ceramic material from the set of material couples consisting of: MoCu and $Al_2O_3$; Ta and $Al_2O_3$; and FeCrSi—$Y_2O_3$ and 8 mol YSZ.

16. The method of claim 10, further comprising:
forming the substrate and the layer to have cooperating surface features;
aligning the surface features of the substrate and the layer together prior to the step of co-sintering such that the chemical bond formed is reinforced by mechanical cooperation between the surface features.

17. The method of claim 10, further comprising:
the step of forming a layer comprising particles of a ceramic material further comprises forming an intermediate layer comprising both metal and ceramic particles and forming a top layer consisting of ceramic particles; and
co-sintering the intermediate layer onto the substrate and the top layer onto the intermediate layer with a co-processing cycle wherein the sintering shrinkage of the substrate and that of the intermediate layer stay within 1.0% of each other throughout the co-sintering and the sintering shrinkage of the intermediate layer and that of the top layer stay within 1.0% of each other throughout the co-sintering.

* * * * *